United States Patent [19]

Smolensky et al.

[11] Patent Number: 5,616,303
[45] Date of Patent: Apr. 1, 1997

[54] CENTRIFUGAL BED REACTOR

[75] Inventors: Leo A. Smolensky, Concord; S. Ronald Wysk, Stow; Zhen W. Lin, Acton, all of Mass.

[73] Assignee: Gas Research Institute, Chicago, Ill.

[21] Appl. No.: 321,339

[22] Filed: Oct. 11, 1994

[51] Int. Cl.⁶ ............................. F27B 15/08; B01J 8/00
[52] U.S. Cl. .................. 422/147; 422/139; 422/145; 423/659; 55/345; 55/347; 55/349; 55/459.1; 110/216; 110/245; 96/139; 95/107
[58] Field of Search .................... 422/139, 145, 422/147, 213, 232; 423/659; 110/216, 245; 55/459.1, 455, 345, 347, 349; 95/107; 96/150, 138, 139

[56] References Cited

U.S. PATENT DOCUMENTS

| | | | |
|---|---|---|---|
| 2,044,976 | 6/1936 | Fasting | 366/25 |
| 2,373,969 | 4/1945 | Lincoln | 55/338 |
| 2,453,593 | 11/1948 | Putney | 55/398 |
| 2,845,259 | 7/1958 | Henrichsen | 432/80 |
| 3,242,888 | 3/1966 | Klovers et al. | 110/246 |
| 3,834,860 | 9/1974 | Fukuda et al. | 432/58 |
| 4,125,363 | 11/1978 | Hansen | 432/106 |
| 4,193,779 | 3/1980 | Hencke | 55/290 |
| 4,354,826 | 10/1982 | Krüger et al. | 432/18 |
| 4,511,333 | 4/1985 | Kunze | 432/106 |
| 4,664,887 | 5/1987 | Engstrom | 422/147 |
| 4,679,511 | 7/1987 | Holmes et al. | 110/216 |
| 4,881,476 | 11/1989 | Becker et al. | 110/347 |
| 4,900,516 | 2/1990 | Engstrom et al. | 422/147 |
| 5,034,196 | 7/1991 | Zenz et al. | 422/147 |

OTHER PUBLICATIONS

Brochure: Air Pollution Control Systems For Industry; Centrifield, Assignee: Entoleter.

*Primary Examiner*—Robert J. Warden
*Assistant Examiner*—Hien Tran
*Attorney, Agent, or Firm*—Hill, Steadman & Simpson

[57] ABSTRACT

A combination reaction chamber and gas/solids separator is provided in a common reactor vessel. The reactor is capable of carrying out various types of gas/solids reactions within the reaction chamber and, contemporaneously, separates the gas from the particulate solids by way of a separator disposed within the reaction chamber. Gas exits the reaction chamber through an outlet disposed along a central axis of the chamber. Solids exit the chamber through an outlet disposed along the outer periphery of the chamber. The reactor provides improved mass transfer rates as well as selective residence times.

26 Claims, 3 Drawing Sheets

CENTRIFUGAL BED REACTOR

FIELD OF THE INVENTION

This invention relates generally to gas/solids reactions involving heat and mass transfer between gas and solid phase materials. Specifically, this invention relates to fluidized bed reactors and gas/solids separators. More particularly, this invention relates to a reactor that combines a reaction chamber and a gas/solids separator within a common vessel.

BACKGROUND OF THE INVENTION

Many industries carry out gas/solids reactions that involve heat and mass transfer between the gas and solid phase materials. In most of these reactions, the solid material or particulate solids are retained as a final product. Therefore, if the reaction is carried out whereby the particulate solids are exposed to a flow of gas or the particulate solids are entrained in a flow of gas, the solids must thereafter be separated from the gas. The two principal operations, i.e. the reaction and the subsequent separation, have normally been considered and have been treated as mutually exclusive operations. The present invention provides an improvement over the prior art because it provides equipment and methods which effectively combine these two operations, i.e. the reaction and the separation, into a single vessel.

The consolidation of the reactor and separator within a single vessel saves space, construction costs and operating costs. In addition, the consolidation of the reaction and separation operations within a single vessel improves the mass transfer between the gas and solids and further enables the designers and operators of the apparatus to control the residence time of the particles within the reaction vessel.

By way of background, a variety of industries conduct continuous reactions involving gases and solids. The operations of drying, calcining, desulfurization and soil remediation are just a few examples. The operations of drying and calcining are similar in nature and provide clear examples of a gas/solids reaction.

"Drying" is defined as the removal of free or uncombined water from a raw feed stock, i.e., solid particulate. "Calcining", on the other hand, is defined as the removal of chemically bound water (or other gases) which produces a chemical change in the raw material. Both operations are conducted under high temperatures. Both operations involve the transfer of mass (water) from the solid particulate to the gas phase.

With specific reference to calcining, the most common calcining systems in use today are rotary kilns. In a rotary kiln, the solids move countercurrently to gas by gravity force as the kiln rotates. The rotation of the kiln enhances the mass transfer between the gas and solids. Some solids may be entrained in the gas flow and have to be collected by a separate collecting device. One primary disadvantage to the rotary kiln is that the residence time for all particles is the same, regardless of individual particle size. The uniform residence time results in an overexposure of smaller particles to the hot gas resulting in an over drying or "dead burning". Further, coarser or heavier particles may be under dried or under calcined.

A flash calciner includes a "cyclonic-type" reactor whereby the gas/solid flow obtains a cyclone patterned fluidized bed within the reactor. The solids are distributed in a cyclonic pattern against the reactor wall. This results in an uneven distribution of solids against the reactor wall thereby decreasing the mass transfer between the gas and solid phase. As in rotary kilns, the residence time for all particles in a flash calciner is the same.

Further, in both the rotary kiln and flash calciner designs, gas/solid separation is treated as a separate operation, downstream from the principal reaction.

A circulating fluidized bed reactor (CFB) includes a reaction chamber in communication with a separate cyclone which recirculates the solids back into the reaction chamber. While the cyclone of the CFB does separate out some of the solids, the CFB still requires a tall reaction chamber for proper solids distribution and a separate, bulky cyclone for recirculation of the solids back into the reaction chamber. Even if a CFB features an "integral" solids separator like the one disclosed in U.S. Pat. No. 4,679,511, a CFB includes high construction costs due to the required height of the reaction chamber and the separate cyclone.

Accordingly, many industries would welcome a reactor that combines a single reaction chamber with a gas/solids separation system. The principal gas/solids reaction could take place in the reaction chamber and a primary separation process would be conducted in the reaction chamber before the particulate solids product exits the system separately from the bulk of the gas. Further, many industries would welcome an improved reactor design that increases the mass transfer between the particulate solids and the gas and further many industries would welcome a reactor whereby the residence time of the particles is dependent upon particle size and is not uniform for particles of all sizes.

SUMMARY OF THE INVENTION

The present invention satisfies the aforenoted needs by providing a reactor that combines a reaction chamber and a gas/solids separator within a single vessel. The reactor provided by the present invention also improves mass transfer between solid particulates and gas as well as provides a residence time that is dependent upon particle size. Further, the residence time provided by the present invention may be easily controlled with design modifications as well as varying the gas flow rates of the outlets.

The reactor of the present invention includes a generally cylindrically shaped or vortex-shaped reaction chamber. A means for separating solid particles entrained in a flow of gas from the flow of gas is disposed within the reaction chamber along a central axis of the reaction chamber. A passageway is provided within the reaction chamber that extends about the gas/solids separator. The passageway is defined as the space between the separator and the inside surface of the outer wall of the reaction chamber. Gas and particulate solids flow through the passageway and around the separator. The gas/solids flow is introduced tangentially into the reaction chamber which causes a substantial portion of the gas and solids to follow a path defined by the passageway thereby creating a circular flow around the gas/solids separator within the reaction chamber.

Gas exits the reaction chamber through a first outlet disposed along the axis of the reaction chamber and within the gas/solids separator. Thus, as the gas/solids flow enters the reaction chamber tangentially and follows the path defined by the passageway, gases will enter the gas/solids separator and will exit through the first outlet disposed along the axis of both the reaction chamber and the gas/solids separator. Centrifugal forces imposed on the particulate solids causes the solids to be dispersed evenly along the inside surface of the outer wall of the reaction chamber. The even distribution of particulate solids along the inside surface of the reaction chamber improves each particle's contact with the gas flow and therefore improves mass transfer between the particles and the gas.

The particulate solids leave the reaction chamber through a second outlet disposed in the outer wall of the reaction chamber. The second outlet is preferably disposed at an opposing end of the passageway from the inlet so that solids leaving the chamber through the second outlet must first follow the pathway along the outer wall of the reaction chamber. Therefore, as gas and particles enter the reaction chamber, the particles are blown against the outer wall of the reaction chamber. As additional gas enters the system, the particles are blown along the inside surface of the outer wall and will eventually arrive at the second outlet where the particulate solids exit the system.

The gas/solids separator may be provided in the form of a curvilinear louver separator ("CLS") or a specially configured center tube. In the CLS embodiment, a center tube is provided with a series of curved louver blades mounted to and extending radially outward from the center tube. The blades are curved in the direction of the gas/solids flow around the separator. In order for gas to escape or exit the reaction chamber, the gas must proceed in a direction around the separator and then make a sharp turn between two adjacent curved blades before passing through an opening in the center tube and out the first inlet disposed along the axis of both the separator and the reaction chamber.

In the center tube design, a specially configured center tube is disposed along a central axis of the reaction chamber. The tube may include longitudinal slits through which gas passes to the first outlet or the tube may include a plurality of apertures through which gas passes to the first outlet.

In both the CLS and the center tube configurations, the gas exits the reaction chamber through an outlet disposed along a central axis of the reaction chamber and the separator. This is an effective gas/solids separation scheme because the centrifugal forces imposed on the particulate solids precludes all of the solids, with the exception of some fines, from travelling radially inward within the reaction chamber. In other words, the centrifugal forces imposed on the particulate solids force the solids along the outer wall of the reaction chamber. Because gas is far less subject to centrifugal forces than particulate solids, a portion of the gas is able to exit the system through a centrally located gas/solids separator such as a CLS or alternative center tube design.

The present invention also lends itself to an improved method of simultaneously conducting a gas/solids reaction and gas/solids separation. First, particulate solids are entrained in a flow of gas and introduced into a reaction chamber tangentially or at or near the inside surface of the outer wall of the chamber. The gas/solids mixture is then circulated within the reaction chamber about a gas/solids separator that is centrally located within the reaction chamber. Gas is separated from the particulate solids as it passes through the gas/solids separator. While centrifugal forces imposed on the particulate solids prevent the solids from travelling radially inward within the reaction chamber toward the gas/solids separator. Therefore, the particulate solids remain distributed along and inside surface of the outer wall of the reaction chamber and a portion of the gas will pass through the separator disposed in the middle of the reaction chamber. The particulate solids are retained within the reaction chamber for a longer time period than the gas as the solids are blown along the inside surface of the outer wall of the reaction chamber. The solids are then removed through an outlet disposed in the outer wall of the reaction chamber.

Therefore, it is an object of the present invention to provide an improved reactor which combines a reaction chamber and a gas/solids separator within a common vessel.

Still another object of the present invention is to provide an improved reactor for gas/solids reactions that affords improved mass transfer between the particulate solids and the gas.

Still another object of the present invention is to provide an improved gas/solids reactor with the ability to vary the solids residence time by adjusting the gas flows leaving both outlets. At a given total gas flow, average solids residence time in a given centrifugal bed reactor can be increased or decreased by changing the ratio of gas flows leaving the two outlets.

Yet another object of the present invention is to provide an improved reactor for gas/solids reaction whereby the residence time of the particulate solids is dependent upon the size of the particulate solids and is not uniform for all particles.

Still another object of the present invention is to provide a method for conducting a gas/particulate solids chemical reaction and a gas/particulate solids separation within a common vessel.

Other features and advantages of the invention will appear from the following description in which three embodiments have been set forth in detail in conjunction with the accompanying drawings.

BRIEF DESCRIPTION OF THE DRAWINGS

This invention is illustrated more or less diagrammatically in the accompanying drawing, wherein.

Figure 1:
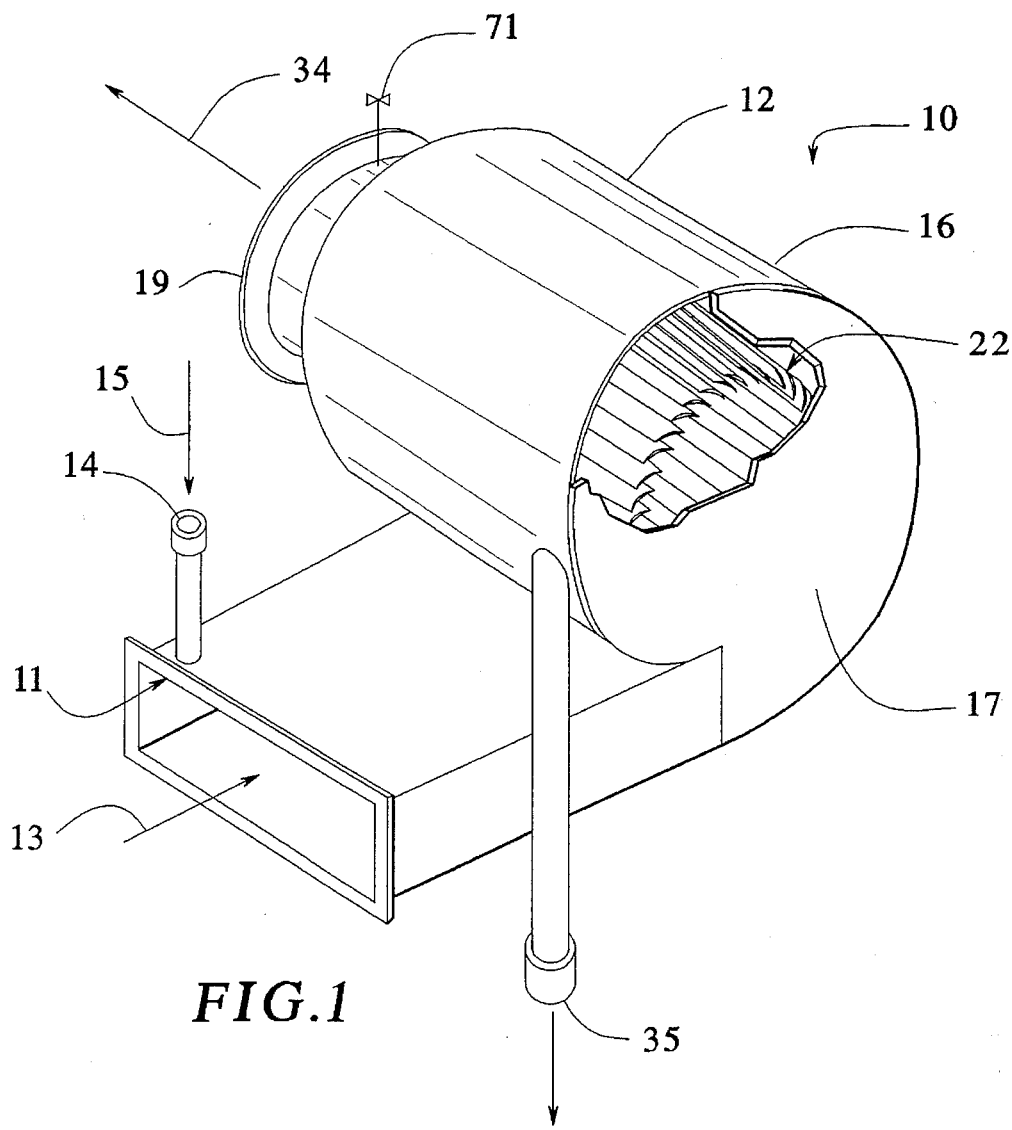
FIG. 1 is a perspective view of a reactor made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to refer to like or similar parts from Figure to Figure in the following description of the drawings.

The dramatic improvement contributed by the present invention is best understood after consideration of the prior art. Specifically, no prior art reference combines a reaction chamber and a separator in a single reactor vessel where the gas/solids reaction is carried out in the reaction chamber and a gas/solids separator separates the particulate solids from the gas. As noted above, reaction processes and the separation processes have long been considered mutually exclusive operations and have been carried out in separate reaction vessels. The present invention combines the reaction chamber and the separator within a single vessel thereby saving space, equipment and money. Further, as shown below, the combination reaction chamber/separator provides improved mass transfer over that taught by the prior art. Further, the combination reaction chamber/separator disclosed herein also provides selective residence times which depend upon particle size. In contrast, the prior art reactors provide a single residence time for all particles, regardless of particle size.

Turning first to FIG. 1, a reactor 10 made in accordance with the present invention is disclosed. The reactor 10 includes a primary inlet 11 for the introduction of gas and solids into the reaction chamber shown generally at 12. Gas and particulate solids enter the reaction chamber 12 in a tangential fashion as illustrated by the arrow 13. In the embodiment illustrated in FIG. 1, gas is provided upstream of the arrow 13 and particulate solids are provided through the inlet 14 in the direction of the arrow 15.

Figure 2:
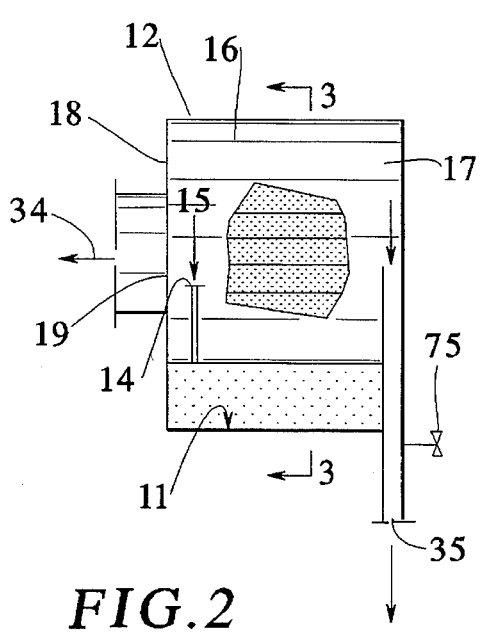
FIG. 2 is a front end view of the reactor shown in FIG. 1.
Figure 3:
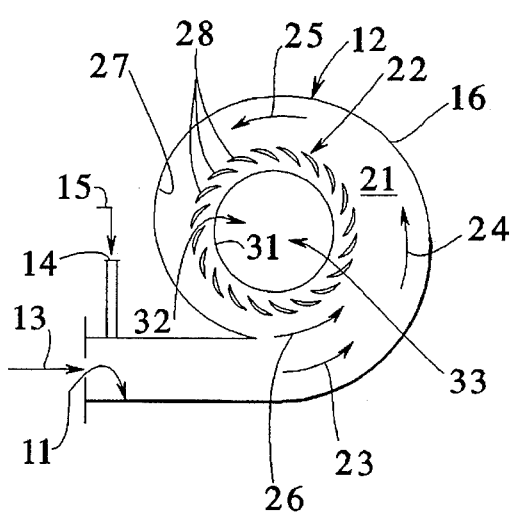
FIG. 3 is a side sectional view taken substantially along line 3—3 of FIG. 2.

The reaction chamber 12 is generally cylindrical or vortex-shaped and includes an outer wall 16 and closed end 17. Turning to FIG. 2, the open end 18 includes an outlet 19 through which gas leaves the reaction chamber 12. As seen in FIG. 2, the inlet 11 is essentially a plenum having the same length as the reaction chamber 12. The solids entering the system through the inlet 14 are entrained in the flow of gas inside the inlet 11 before the gas/solids mixture enters the reaction chamber 12 as shown in FIG. 3. As noted above, the gas/solids mixture enters the reaction chamber 12 through the inlet 11 in a tangential fashion. In other words, the mixture enters the system near an outer periphery of the chamber 12 and proceeds through the passageway shown generally at 21 that surrounds the gas/solids separator shown generally at 22. The passageway 21 and the flow of gas/solids therein extends around the separator 22 as indicated by the arrows 23, 24, 25, 26.

Centrifugal forces exerted on the particulate solids cause the solids to be thrown against the inside surface 27 of the outer wall 16 of the reaction chamber 12. In contrast, because centrifugal forces are not significant with respect to gas molecules, the gas eventually assumes a path that goes in between two adjacent louver blades shown generally at 28 before passing through openings (not shown in FIG. 3) disposed in the center tube 31 of the separator 22. The separator 22 shown in FIGS. 1-3 is known as a curvilinear louver separator or "CLS". The primary features of a CLS are a center tube 31 and the plurality of curved louver blades 28 attached to the outer surface of the tube 31. The blades 28 are curved in the direction of the gas flow indicated by the arrows 23-26. Gas exits the reaction chamber 12 by eventually taking a path similar to those illustrated by the arrows 32, 33, or a path which takes the gas between two adjacent blades 28 before it passes through an opening (not shown) in the tube 31 and exits through the outlet 19 in the direction of the arrow 34 (see FIGS. 1 and 2). Particulate solids as well as some gas exit the chamber 12 through the outlet 35.

Returning to FIG. 3, centrifugal forces imposed on the particles causes the particles to be evenly distributed along the inside surface 27 of the outer wall 16 of the reaction chamber 12. This even distribution of the particulate solids against the inside surface 27 improves mass transfer between the particulate solids and the gas because it improves exposure of the solids to the gas as the gas flows in the direction of the arrows 23–26. The improved gas/solids contact and therefore the improved mass transfer between the gas and the solids is a substantial improvement over the cyclone pattern achieved with the circulating fluidized bed calciners which create a cyclone distribution pattern of the circulating fluidized bed reactors. Simply put, the reactor 10 achieves superior mass transfer rates because the particulate solids are entrained in the gas flow within the inlet 11 upstream of the reaction chamber 12 and further the particulate solids are evenly distributed against the inside surface 27 of the outer wall 16 of the reaction chamber which provides enhanced gas/solids contact.

Figure 4:
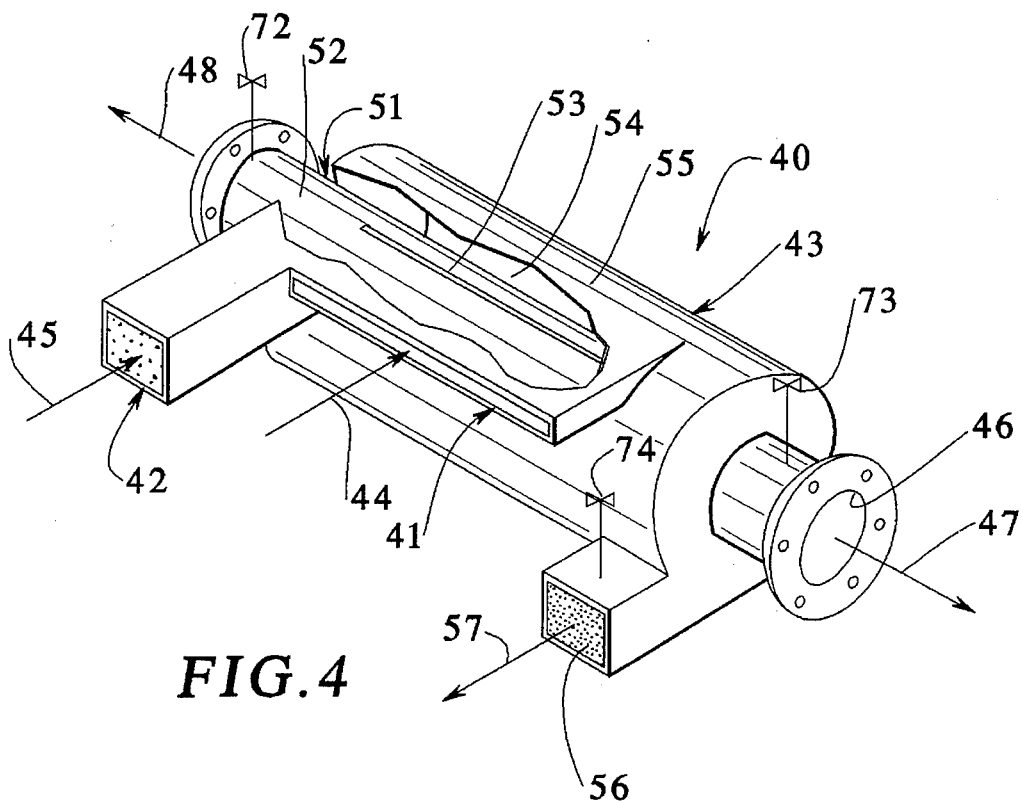
FIG. 4 is a perspective view of a second reactor made in accordance with the present invention.

A second embodiment of the present invention is illustrated in FIG. 4. The reactor 40 features two inlets 41, 42. The inlet 41 is for gas or flue gas and enters the reaction chamber 43 in the direction of the arrow 44. The inlet 42 is for the introduction of particulate solids already entrained in a flow of gas. Both the entrained flow of particulate solids and the gas enter the reaction chamber 43 tangentially as indicated by the arrows 44, 45. The reactor 40 shown in FIG. 4 features a gas outlet 46 which enables gas to exit the chamber 43 in either axial direction as indicated by the arrows 47, 48. The separator 51 features a center tube 52 which includes a plurality of longitudinal slits 53 (only one of which is shown in FIG. 4). The slits 53 function in a manner similar to the CLS 22 shown in FIGS. 1-3. The centrifugal forces force the particulate solids outward against the inside surface 54 of the outer wall 55 of the reaction chamber 43. Meanwhile, gas, relatively unaffected by centrifugal forces, will proceed through the slits 53 and exit out the gas outlet 46 in the direction of the arrows 47, 48. The solids outlet is shown at 56 and the particulate solids will be carried out in the direction of the arrow 57 by a flow of gas.

Figure 5:
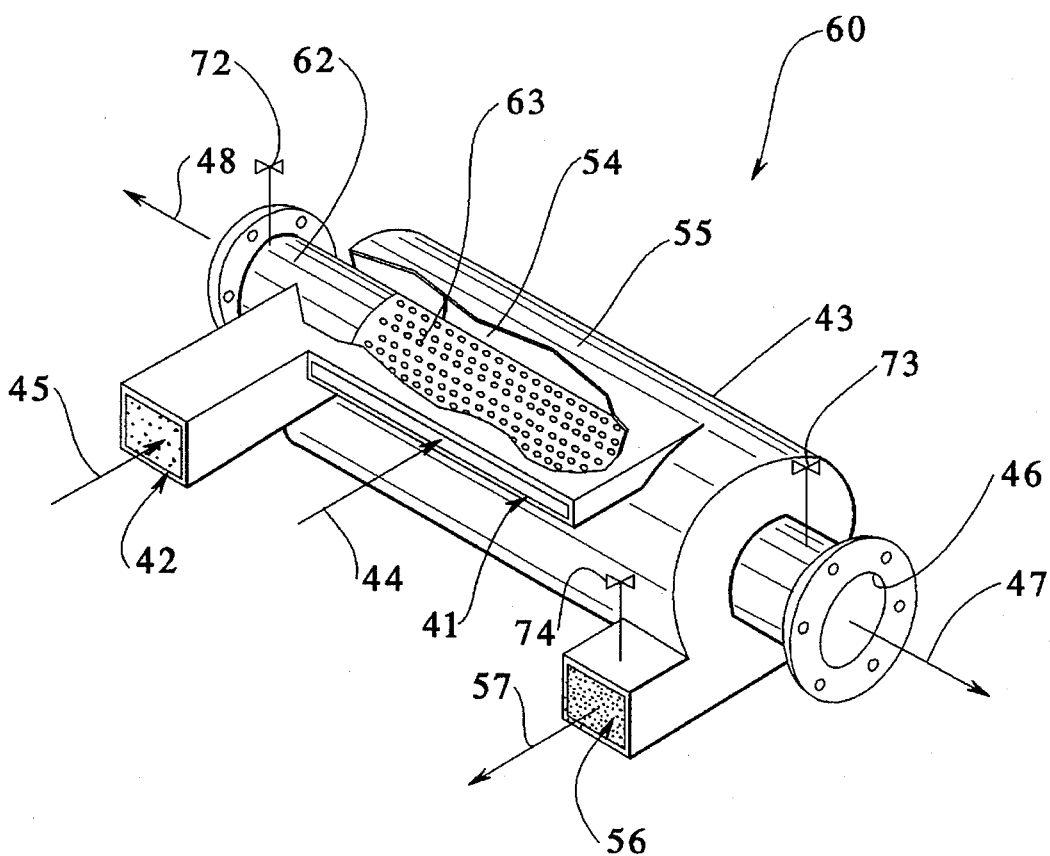
FIG. 5 is a perspective view of a third reactor made in accordance with the present invention.

Turning now to FIG. 5, a nearly identical design is provided with the exception of the center tube 62 which features a plurality of apertures 63 as opposed to the longitudinal slits 53 disposed in the center tube 52 as shown in FIG. 4. Otherwise, the construction of the reactor 60 shown in FIG. 5 is analogous to the reactor 40 shown in FIG. 4. Like reference numerals have been used to identify the analogous parts.

In general, the outlet flow of gas through the flue gas outlets 19 (FIGS. 1-3) or 46 (FIGS. 4-5) as well as the gas flow through the solids outlets 35 (FIGS. 1-2) and 56 (FIGS. 4-5) can be controlled by the use of a valve or other similar device. By controlling the flow of gas through the outlets 19, 35, 46, 56, the residence time of the particles can be controlled as well as the fineness of the solids leaving the system with the clean gas through the gas outlets 19, 46. Any valve suitable for gas flows can be used for the flue gas outlets 19, 47; an L-valve or other suitable device may be used to control the flow of gas through the solids outlets 35, 56. The flow of solids from the solids outlet or solid discharge lines 35 (see FIGS. 1-3) and 56 (see FIGS. 4-5) can be directed to a cyclone collector (not shown) for consolidation of the particulate solid product. The cyclone collector required is smaller than that taught by the prior art because it treats only the bleed flow of gas which is usually five to ten percent of the total gas flow rate. Accordingly, any cyclone collector employed will have a high separation efficiency due to the high concentration of solids in the outlets 35, 56.

Figure 6:
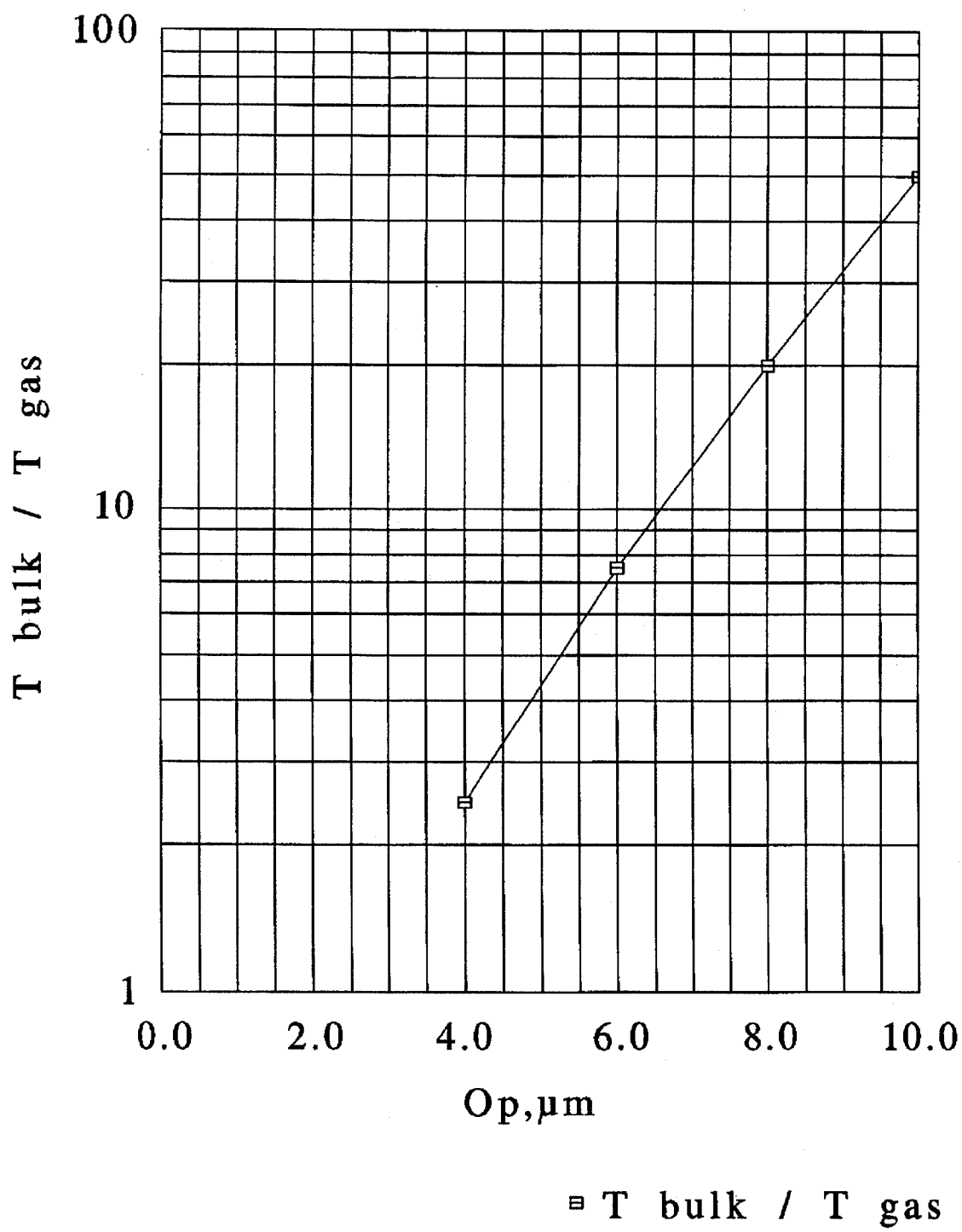
FIG. 6 is a logarithmic plot of the ratio of the residence time of particles over the residence time of gas versus the diameter of the particles.

The residence times of various particle diameters ($D_p$) are illustrated in FIG. 6. As shown in FIG. 6, the residence time ($T_{bulk}$) increases as the diameter ($D_p$) increases. Further, as noted above, the residence time of the particles can be controlled by controlling the flow rate through the gas outlets 19, 46. One convenient way to control the flowrate through the gas outlets 19, 46 is to provide adjustable valves, such as those indicated at 71, 72 and 73 in the gas flow outlets 19, 46 as indicated in FIGS. 1, 4 and 5. Further valves, such as those indicated at 75 in solids outlet 35 (see FIG. 2) and 74 in solids outlet 56 (see FIGS. 4 and 5) may also be employed to control flowrates through the outlets 35, 56. In the embodiment shown in FIGS. 1–3, the residence time can be adjusted by changing the louver blade 28 inclination angles.

Thus, an improved reactor that combines the reaction chamber and the gas/solids separator is provided. The reactor of the present invention is cheaper to build because it combines two operations which have been regarded as mutually exclusive by the prior art. Further, the present invention provides a reaction chamber with improved mass transfer characteristics due to its superior distribution of particulate solids against the reaction chamber wall. Further, the present invention provides a reactor with residence times that depend upon the size of the particles and further residence times that can be adjusted post-construction.

Although only three embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A reactor combining a reaction chamber and a gas/solids separator, the reactor comprising:

a reaction chamber having generally cylindrical configuration with two opposing ends, means for separating solid particles from a flow of gas, the means for separating being disposed along an axis within the reaction chamber, the means for separating including at least one opening for permitting gas to flow therethrough and out of the reaction chamber, the means for separating precluding solid particles from flowing through the opening, a passageway between the means for separating and an inside surface of an outer wall of the reaction chamber, the passageway extending around the means for separating to provide a generally circular path about the means for separating, an inlet to the reaction chamber, the inlet for tangentially introducing a flow of a gas/solids mixture into the passageway, a first outlet deposed along the axis of the reaction chamber for permitting gas flowing through the opening to exit the reaction chamber, a second outlet passing through the inside surface of the outer wall of the reaction chamber for permitting solid particles to exit the chamber, the second outlet being aligned tangentially to the inside surface of the outer wall, the second outlet being disposed radially outward from the first outlet, the inlet disposed adjacent to one of said opposing ends, the second outlet being disposed adjacent to the other of said opposing ends, the gas/solids mixture flowing through the inlet initially following the passageway upon entry into the reaction chamber, the first outlet providing an outlet for gas flowing through the means for separating, the second outlet providing an outlet for solid particles carried along the inside surface of the outer wall of the reaction chamber.

2. The reactor of claim 1, wherein the means for separating comprises a center tube extending along the axis of the reaction chamber, the center tube being connected to the first outlet, a plurality of curved louvers extending radially outward from the center tube but curving tangentially around the center tube in a direction defined by the flow of gas/solids mixture through the passageway, the at least one opening comprising a plurality of openings being disposed on the center tube and between adjacent louvers, whereby gas exiting the reaction chamber through the first outlet flows from the passageway, between two louvers, through the openings, through the center tube and out through the first outlet.

3. The reactor of claim 1, wherein the means for separating is a curvilinear louver separator.

4. The reactor of claim 1, wherein the reaction chamber is vortex-shaped.

5. The reactor of claim 4, wherein the inlet comprises a plenum disposed tangentially to the reaction chamber and extending along a length of the reaction chamber, whereby the flow of the gas/solids mixture is introduced along the length of the reaction chamber.

6. The reactor of claim 5, wherein the inlet includes a gas inlet and a solids inlet, both the gas inlet and the solids inlet being disposed upstream of the reaction chamber, the gas inlet being disposed upstream of the solids inlet.

7. The reactor of claim 1, wherein the means for separating comprises a center tube extending along the axis of the reaction chamber, the center tube being connected to the first outlet, the opening being disposed on the center tube which allows gas to flow from the passageway, through the opening, through the center tube and out through the first outlet.

8. The reactor of claim 7, wherein the at least one opening includes a plurality openings on the center tube.

9. The reactor of claim 8, wherein the openings comprise spaced-apart longitudinal slits disposed on the center tube.

10. The reactor of claim 8, wherein the openings comprise spaced-apart apertures.

11. The reactor of claim 7, further comprising a second inlet for tangentially introducing a flow of gas into the passageway of reaction chamber.

12. The reactor of claim 11, further comprising a third outlet disposed along the axis of the reaction chamber at an opposing end thereof from the first outlet, the first and third outlets enabling gas to flow out of the reaction chamber along either axial direction thereof.

13. The reactor of claim 1 further comprising
means for controlling the residence time of solid particles in the reaction chamber.

14. The reactor of claim 13,
wherein the means for controlling the residence time of solid particles includes a first adjustable valve for controlling flow through the first outlet and a second adjustable valve for controlling flow through the second outlet.

15. A reactor combining a reaction chamber and a gas/solids separator, the reactor comprising:
   a vortex-shaped reaction chamber having two opposing ends,
   an inlet to the reaction chamber, the inlet for tangentially introducing a flow of a gas/solids mixture into reaction chamber,
   a first outlet deposed along the axis of the reaction chamber for permitting gas to exit the reaction chamber,
   a second outlet passing through an inside surface of an outer wall of the reaction chamber for permitting solid particles to exit the chamber, the second outlet being aligned tangentially to the inside surface of the outer wall, the second outlet being disposed radially outward from the first outlet, the inlet disposed adjacent to one of said opposing ends, the second outlet being disposed adjacent to the other of said opposing ends,
   a curvilinear louver separator disposed along an axis within the reaction chamber, the curvilinear separator substantially precluding solid particles from exiting the reaction chamber through the first outlet,
   a passageway between the curvilinear louver separator and the inside surface of the outer wall of the reaction chamber, the passageway extending around the curvilinear louver separator to provide a generally circular path about the curvilinear louver separator,
   the curvilinear louver separator comprising
      a center tube extend along the axis of the reaction chamber, the center tube being in communication the first outlet,
      a plurality of curved louvers extending radially outward from the center tube but curving tangentially around the center tube in a direction defined by the flow of gas/solids mixture through the passageway,
      a plurality of openings on the center tube disposed between adjacent louvers,
      whereby gas exiting the reaction chamber through the first outlet flows from the passageway, between two louvers, through the openings through the center tube and out through the first outlet,
      the gas/solids mixture flowing through the inlet before initially following the passageway upon entry into the reaction chamber, the first outlet providing an outlet for gas flowing through the curvilinear louver separator, the second outlet providing an outlet for solid particles carried along the inside surface of the outer wall of the reaction chamber.

16. The reactor of claim 15,
wherein the inlet comprises a plenum disposed tangentially to the reaction chamber and extending along a length of the reaction chamber,
whereby the flow of the gas/solids mixture is introduced along the length of the reaction chamber.

17. The reactor of claim 16,
wherein the inlet includes a gas inlet and a solids inlet, both the gas inlet and the solids inlet being disposed upstream of the reaction chamber, the gas inlet being disposed upstream of the solids inlet.

18. The reactor of claim 15 further comprising
means for controlling the residence time of solid particles in the reaction chamber.

19. The reactor of claim 18,
wherein the means for controlling the residence time of solid particles includes a first adjustable valve for controlling flow through the first outlet and a second adjustable valve for controlling flow through the second outlet.

20. A reactor combining a reaction chamber and a gas/solids separator, the reactor comprising:
   a vortex-shaped reaction chamber having two opposing ends,
   a first inlet to the reaction chamber, the first inlet for tangentially introducing a flow of a gas/solids mixture into reaction chamber,
   a second inlet to the reaction chamber, the second inlet for tangentially introducing a flow of a gas/solids mixture into reaction chamber,
   a first outlet deposed along the axis of the reaction chamber, the first outlet enabling gas to flow out of the reaction chamber in either axial direction,
   a second outlet passing through an inside surface of an outer wall of the reaction chamber for permitting solid particles to exit the chamber, the second outlet being aligned tangentially to the inside surface of the outer wall, the second outlet being disposed radially outward from the first outlet, the inlet disposed adjacent to one of said opposing ends, the second outlet being disposed adjacent to the other of said opposing ends,
   a gas/solids separator disposed along an axis within the reaction chamber, the gas/solids separator substantially precluding solid particles from exiting the reaction chamber through the first outlet,
   a passageway between the gas/solids separator and the inside surface of the outer wall of the reaction chamber, the passageway extending around the gas/solids separator to provide a generally circular path about the gas/solids separator,
   the gas/solids separator comprising
      a center tube extending along the axis of the reaction chamber, the center tube being in communication with the first outlet,
      a plurality of openings on the center tube providing communication between the passageway and the first outlet,
      whereby gas exiting the reaction chamber through the first outlet flows from the passageway, through the openings through the center tube and out through the first outlet,
   the gas/solids mixture flowing through the first inlet, before initially following the passageway upon entry into the reaction chamber, the first outlet providing an outlet for gas flowing through the gas/solids separator, the second outlet providing an outlet for solid particles carried along the inside surface of the outer wall of the reaction chamber.

21. The reactor of claim 20,
wherein the openings comprise spaced-apart longitudinal slits disposed on the center tube.

22. The reactor of claim 20,
wherein the openings comprise spaced-apart apertures disposed on the center tube.

23. The reactor of claim 20 further comprising means for controlling the residence time of solid particles in the reaction chamber.

24. The reactor of claim 23, wherein the means for controlling the residence time of solid particles includes a first adjustable valve for controlling flow through the first outlet and a second adjustable valve for controlling flow through the second outlet.

25. A method of exposing particulate solids to gas flow in a reaction chamber and thereafter substantially separating the particulate solids from the gas in said reaction chamber, the method comprising:

entraining the particulate solids in a flow of gas to provide a gas/solids flow;

introducing the gas/solids flow into the reaction chamber through an inlet, the reaction chamber having a generally cylindrical configuration with two opposing ends and accommodating a gas/solids separator along a generally central axis of the reaction chamber, the reaction chamber also including a passageway between the gas/solids separator and an inside surface of an outer wall of the reaction chamber, the passageway extending around the gas solids separator to provide a generally circular path about the gas/solids separator and the axis of the reaction chamber;

separating a substantial amount of the entrained particulate solids from the gas by introducing the gas/solids flow into the reaction chamber at a velocity sufficient to cause the particulate solids to engage the inside surface of the outer wall of the reaction chamber while a portion of the gas passes through openings disposed in the gas/solids separator, the openings in the gas/solids separator providing communication between the passageway and a first outlet;

retaining particulate solids in the reaction chamber by engaging the particulate solids with gas and forcing the solids against the inside surface of the outer wall of the reaction chamber by the action of the gas against the retained particulate solids and centrifugal forces imposed upon the particulate solids;

removing the particulate solids from the reaction chamber by providing a second outlet disposed in the outer wall of the reaction chamber and positioned tangentially to the inside surface of the outer wall, the second outlet being disposed radially outward from the first outlet, the inlet disposed adjacent to one of said opposing ends, the second outlet being disposed adjacent to the other of said opposing ends, the second outlet capturing particulate solids that are pushed along the outer wall of the reaction chamber by flowing gas.

26. The method of claim 25 further comprising controlling the residence time of solid particles in the reaction chamber by controlling the flow rates of gas through the first and second outlets.

\* \* \* \* \*